United States Patent Office 3,530,174
Patented Sept. 22, 1970

3,530,174
PURIFICATION OF ORGANIC ACIDS
Roy T. Gottesman, Glen Rock, and Henri Sidi, Paramus, N.J., assignors to Tenneco Chemicals, Inc., a corporation of Delaware
No Drawing. Filed Oct. 5, 1966, Ser. No. 584,336
Int. Cl. C07c 65/02
U.S. Cl. 260—521
8 Claims

ABSTRACT OF THE DISCLOSURE

Salicylic acid and other hydroxy aromatic monocarboxylic acids may be readily purified and decolorized by sequential treatment of an aqueous solution containing the acid with a chelating agent, such as tetrasodium ethylenediaminetetraacetate, and then with activated carbon under carefully controlled conditions.

---

This invention relates to a process for the purification of hydroxy aromatic carboxylic acids. More particularly, the invention pertains to a process for the purification and decolorization of hydroxy aromatic carboxylic acids such as salicyclic acid.

It is well known that hydroxy aromatic acids can be prepared by the reaction of alkali metal phenates with carbon dioxide in the absence of water. The reaction product mixture obtained by such a process is generally dissolved in water, and the resulting solution is then acidified to precipitate the hydroxy aromatic carboxylic acid product such as salicylic acid, lower alkyl substituted salicylic acids, 2-hydroxy-3-naphthoic acids, and the like. The precipitated hydroxy aromatic carboxylic acids are recovered by conventional means and employed in a variety of known industrial applications. It has been found, however, that certain impurities are formed during the hydroxy aromatic carboxylic acid synthesis which tend to discolor the acid product as well as the subsequent compounds or compositions prepared therefrom. This discoloration problem has not been readily resolved in a manner which would be economic for large scale commercial operations. Thus, for example, the conventional treatment with decolorizing carbon has proven to be ineffective. The failure of such a treatment may be attributed to the observation that hydroxy aromatic carboxylic acids such as salicylic acid function as chelating agents and somehow prevent certain colorant contaminants from being easily removed. It is also possible that the impurities found in the hydroxy aromatic carboxylic acids are difficult if not impossible to remove below contaminating levels by the use of known purification procedures. Some of the impurities are believed to be inorganic materials while others are unsaturated organic compounds, both of which contribute to discoloration of the hydroxy aromatic carboxylic acid products.

One object of the present invention is to provide a process for the purification of hydroxy aromatic carboxylic acids which avoids the drawbacks of the prior art methods.

A further object of the present invention is to provide a process for the removal of color impurities from hydroxy aromatic carboxylic acids.

A still further object of this invention is to provide a process for the purification and decolorization of salicylic acid.

These and other objects of the invention will become readily apparent from the ensuing description and illustrative embodiments.

In accordance with the present invention it has now been found that hydroxy aromatic carboxylic acids such as salicylic acid may be readily purified and decolorized by sequential treatment with a polycarboxylic acid, an amino polycarboxylic acid, or a metallic salt derivative of said acids and then with activated carbon under carefully controlled operating conditions. When such a procedure is utilized a high quality hydroxy aromatic carboxylic acid product substantially free of discoloration is recovered. Starting from the alkali metal salt of hydroxy aromatic carboxylic acid, produced from the above discussed carboxylation of alkali metal phenates, the present process comprises the following steps:

(a) Dissolving the alkali metal salt of the hydroxy aromatic carboxylic acid in water to obtain an aqueous solution containing from about 10 to 40% by weight, preferably from about 12 to 15% of the alkali metal salt;

(b) Adding a strong mineral acid, such as sulfuric acid, hydrochloric acid, or the like, to the aqueous solution whereby the pH is lowered from about 10–11 to about 4.5–5.8, and preferably to from about 4.5–5;

(c) Adding a minor amount of chelating agent, such as a polycarboxylic acid, an amino polycarboxylic acid, or metallic salt of said acids to the acidified aqueous solution;

(d) Heating the acidified aqueous solution to a temperature within the range of about 25° to 75° C., and preferably from about 50° to 65° C.;

(e) Contacting the heated aqueous solution with activated carbon in accordance with known means such as passing the aqueous solution through an adsorbent column containing finely-divided activated carbon particles, said adsorbent also being maintained at a temperature within the range of about 25° to 75° C., and preferably from about 50° to 65° C.;

(f) Adding a sufficient amount of a strong mineral acid, such as sulfuric acid, hydrochloric acid or the like, to the thus treated aqueous solution to lower its pH to about 1.5 to 3, preferably about 1.8 to 2, whereby the hydroxy aromatic carboxylic acid is precipitated;

(g) Cooling the aqueous solution to a temperature of from about 20° to 35° C., preferably from about 20° to 30° C., and (h) Recovering the precipitated hydroxy aromatic carboxylic acid from the resulting aqueous slurry by conventional means, such as filtration, centrifugation, or the like.

At times it may be advantageous to add additional water to the aqueous feed solution following the initial acidification step in order to prevent the partial precipitation of the hydroxy aromatic acid. Other possible processing modifications include filtration of the aqueous solution following treatment with activated carbon to insure the removal of any carbon or other solids from the solution prior to precipitation.

It will be further understood that the process of this invention may be practiced with any impure hydroxy aromatic carboxylic acid regardless of its source. Thus, the starting material may be the crude hydroxy aromatic carboxylic acid itself or an aqueous solution thereof. The essential features of the invention reside in the sequential treatment of an aqueous solution containing the impure hydroxy aromatic carboxylic acid with a chelating agent which is a polycarboxylic acid, an aminopolycarboxylic acid, or a metallic salt of said acids followed by treatment with an activated carbon. The hydroxy aromatic carboxylic acid precipitated and recovered from the treated solution is characterized by markedly improved purity and color. The order of treatment has been found to be important. If the aqueous feed solution is contacted first with the activated carbon adsorbent and then with the prescribed chelating agent, the hydroxy aromatic carboxylic acid product has an undesirable color which is evidence of incomplete removal of contaminants. The simultaneous treatment with the chelating agent and the activated carbon is also less effective than the sequential treatment called for in the process of this invention.

Control over the pH of the aqueous feed solution has also been found to be an important aspect of the purification process. As previously noted, the aqueous feed solution is acidified with a strong mineral acid, preferably sulfuric acid, to attain a pH within the range of about 4.5 to 5.8. In order to effect the desired degree of purification, it is necessary to maintain the pH within the range throughout the treatment and until it is desired to precipitate the hydroxy aromatic carboxylic acid. At a pH of about 6 or above the high degree of purification sought is not attained.

The initial acidification of the aqueous feed solution as well as the treatment with the chelating agent may be carried out at temperatures ranging from room temperature to about 75° C. However, prior to contact with the activated carbon particles it is preferred to heat the aqueous solution to a temperature within the range of about 50° to 65° C. The use of these low treatment temperatures provides another advantage over certain of the purification proecsses heretofore proposed wherein higher treatment temperatures are required with the result that decomposition of the aromatic acid as well as the appearance of discoloring contaminants is often encountered.

As previously set forth, the starting material may be either an impure alkali metal salt of a hydroxy aromatic carboxylic acid, such as that derived from the carboxylation of an alkali metal phenate, or an aqueous solution of the impure hydroxy aromatic carboxylic acid itself. In either case the hydroxy aromatic carboxylic acid may be salicylic acid, 4-hydroxybenzoic acid, 2,3-dihydroxybenzoic acid, 2,4-dihydroxybenzoic acid, 2-hydroxy-3-naphthoic acid, or other hydroxy aromatic carboxylic acids wherein the aromatic substituent may be mononuclear or polynuclear. The preferred starting material is salicylic acid, and the practice of the process of this invention will result in the recovery of purified and decolorized salicylic acid solids.

The alkali metal constituent of the alkali metal salt of the hydroxy aromatic carboxylic acid may be any metal of Group IA of the Periodic Table of the elements. Sodium and potassium are the preferred alkali metal constituents.

The chelating agent employed in the process of this invention may be a polycarboxylic acid, an amino polycarboxylic acid, or a metallic salt and especially an alkali metal or alkaline earth metal salt of said acids. These include:

Citric acid
Ethylenediaminetetraacetic acid
Diethylenetriaminepentaacetic acid
Tetrasodium ethylenediaminetetraacetate
Tetrapotassium ethylenediaminetetraacetate
Pentasodium diethylenetriaminepentaacetate
Trisodium N-hydroxyethylethylenediaminetriacetate
Calcium disodium ethylenediaminetetraacetate
Sodium salt of N,N-di(beta-hydroxyethyl)glycine The preferred material is tetrasodium ethylenediaminetetraacetate, which is sold under the trademark Versene 100. In general, the amount of chelating agent employed will range from about 0.5 to 4%, preferably 0.9 to 2.5% by weight based on the total weight of the solids in the aqueous feed solution. It will be further understood that the amount of chelating agent employed will vary somewhat depending upon the exact nature of the aqueous feed solution containing the impure hydroxy aromatic carboxylic acid. The chelating agent may be employed either in liquid, flake or powder form.

The activated carbons or charcoals employed in the process are decolorizing carbons prepared from special cellulose stocks by heating them to temperatures above about 150° C. Especially useful are activated carbons prepared from peach pits, nut hulls, wood fibers, and the like. One such material is Nuchar, which is an activated carbon made from a residual organic material obtained in the manufacture of cellulose. Other materials include carbons made from coconut shells, bones and coke. In general, the activated carbon is employed in finely-divided form ranging from about 10 to 200 mesh, although the exact particle size of the activated carbon adsorbent is not a critical feature of this invention. The quantity of activated carbon employed to effect the decolorization treatment varies somewhat with the quantity of discoloring contaminant in the feed material. In general, however, the quantity of adsorbent required is from about 0.9 to 2.5% by weight based on the total solids in the feed solution. Standard carbon-packed beds may be employed in this step of the inventive process. A plurality of columns can be utilized, so that one can be undergoing reactivation while another column is on stream.

The purification and decolorization treatment of the present process may be accomplished by either batch or continuous methods. Conventional equipment and instrumentation may be employed including mixing tanks or mixtures provided with agitators, temperature instruments, pH probes, etc. Conventional means may also be employed for recovering the hydroxy aromatic carboxylic acid from the aqueous solution following treatment with the activated carbon. As previously discussed, a strong mineral acid is added to the solution to lower the pH to at least about 2 whereby the aromatic carboxylic acid precipitates. The temperature at which the precipitation is carried out is important, since the hydroxy aromatic carboxylic acid precipitated at 50° to 65° C. will have a better APHA color rating than that precipitated at 100° C. or higher. The precipitated hydroxy aromatic carboxylic acid is separated from the aqueous slurry by filtration, washed with water, and then dried at a temperature below about 100° C.

The invention will be more fully understood by reference to the following illustrative embodiments. Although the purification of salicylic acid is primarily discussed below because of its commercial importance, other hydroxy aromatic carboxylic acids, such as those delineated above, may also be effectively purified by this process.

EXAMPLE I

Three thousand grams of impure sodium salicylate liquor (pH 11.4 at 25° C.) was charged to a 12-liter flask fitted with a heating mantle, an agitator, a condenser and a thermometer. The charge was diluted with 3000 grams of water, and the resulting solution was acidified to a pH of 4.5 at 25° C. by the addition of 1450 grams of an aqueous sulfuric acid solution (83 grams of 96% sulfuric acid).

Fifteen grams of tetrasodium ethylenediaminetetraacetate (Versene 100) powder was added with agitation. The final pH was 4.65 at 25° C. Dilution with water was then completed by the addition of 1450 grams of water. The resulting Versene-treated, acidified solution was then heated to 60° C. and passed through a column containing 100 grams of a decolorizing activated carbon (Nuchar C-190, 50 mesh). The adsorption column was prepared by filling a 2-inch diameter Pyrex glass pipe with 100 grams of the activated carbon to give a bed depth of 5¼ inches. The activated carbon was held away from the lower support by a 1 inch layer of glass wool, and was topped by another 1 inch layer of glass wool.

The aqueous solution was continuously fed to the activated carbon column at the rate of 1370 grams/hr. The treated solution was then fed directly into a precipitation vessel provided with a heating mantle, an agitator, a thermometer, and a pH probe. The aqueous solution was maintained at a temperature of about 60°–65° C. while 97.8 grams/hr. of a 50% sulfuric acid solution were added to it to lower its pH to 2. Salicylic acid precipitated and was continuously withdrawn from the precipitator in the form of an aqueous slurry which was passed to a cooling vessel to lower its temperature to 20°–30° C. The slurry was then filtered on a Buchner funnel, and the precipitate was washed with water. Approximately 218 grams/hr. of wet cake was recovered. The wet cake was then dried in a vacuum oven at 60° C. under 29 inches Hg pressure to obtain about 132.3 grams/hr. of dried salicylic acid powder. This product had the following analysis:

Appearance—White crystalline solid.
APHA Color—20.
Water—0.37%.

EXAMPLE II

Three hundred pounds of an impure sodium salicylate liquor that had a specific gravity of 1.21 was diluted with 600 pounds of water to form a solution leaving a specific gravity of 1.065. Concentrated sulfuric acid was added to bring the pH of the solution to 5.0.

A solution of 0.42 pound of tetrasodium ethylenediaminetetraacetate (Versene 100) in 2000 ml. of water was added to the solution which was then heated at 60° C. for 30 minutes during which time its pH was maintained at 5.0. To this solution was added 2.1 pounds of activated carbon (Nuchar C–115–A), and the resulting solution was heated at 60° C. for an additional 30 minutes. This solution was filtered and the filter cake was washed with 30 gallons of water. Then 47.8 pounds of concentrated sulfuric acid was added slowly to the filtrate to bring its pH to 1.5 and to precipitate the salicylic acid. The acidified solution was cooled to 25°–30° C., filtered, and washed with water until the filtrate had a constant pH. The recovered salicylic acid was dried under vacuum at 60° C. There was obtained 95.6 pounds of salicylic acid which was a white powder that had an APHA color of 13 and that contained 0.41% of water and 0.02% of ash.

EXAMPLE III

A series of runs was carried out in which portions of an impure salicylic acid liquor which had a specific gravity of 1.218 at 25° C. were treated in accordance with the process of this invention or with a chelating agent and/or activated carbon.

In each case 200 ml. of the liquor was acidified to a pH of less than 5 and then treated with the indicated amount of the decolorizing agent or agents. The salicylic acid was recovered from the treated liquor by the procedure described in Example II. The decolorizing agents used and the results obtained are summarized in the table that follows:

| Example Number | 3A | 3B | 3C | 3D | 3E | 3F |
|---|---|---|---|---|---|---|
| Activated Carbon (Nuchar CA)(g.) | | 3.0 | | 2.6 | 2.6 | 3.0 |
| Tetrasodium ethylene diamine tetraacetate (g.) | | | 0.1 | | 0.1 | 0.1 | 0.1 |
| Final pH | 1.5 | 2.5 | 3.5 | 2.5 | 2.6 | 1.5 |
| Salicylic Acid Recovered (g.) | 71.2 | 65.4 | 59.0 | 65.6 | 68.1 | 69.0 |
| Color of Salicylic Acid (APHA) | 120 | 30 | 26 | 20 | 14 | 12 |
| Remarks | | | | (1) | (2) | (2) |

[1] Simultaneous addition of decolorizing agents.
[2] Sequential addition of decolorizing agents.

The above data demonstrate that an improved yield of light colored hydroxy aromatic carboxylic acid product can be obtained by practicing the purification process of this invention. They also show that the sequential treatment of this invention is superior to treatment with the chelating agent or the activated carbon alone, or to treatment with the decolorizing agents simultaneously.

While particular embodiments of this invention have been illustrated above, it will be understood that the invention is obviously subject to variations and modifications without departing from its broader aspects.

What is claimed is:
1. The process for the purification of hydroxyaromatic monocarboxylic acids that comprises the following sequential steps: (a) forming an aqueous solution of an impure alkali metal salt of an acid selected from the group consisting of salicylic acid, 4-hydroxybenzoic acid, 2,3-dihydroxybenzoic acid, 2,4-dihydroxybenzoic acid, and 2-hydroxy-3-naphthoic acid, said impure salt being the product obtained by the carboxylation of an alkali metal phenate with carbon dioxide in the absence of water; (b) adding to said solution sufficient mineral acid to lower its pH to about 4.5 to 5.8; (c) adding to said solution 0.5% to 4%, based on the weight of solids in the solution, of a chelating agent selected from the group consisting of ethylenediaminetetraacetic acid, diethylenetriaminepentaacetic acid, N-hydroxyethylethylenediaminetriacetic acid, citric acid, and the alkaline earth metal salts of said acids; (d) heating the resulting aqueous solution to a temperature below 75° C.; (e) contacting the heated solution with activated carbon; (f) recovering the carbon-treated solution and acidifying it to a pH in the range of 1.5 to 3; and (g) recovering the precipitated acid from the aqueous slurry.

2. The process of claim 1 wherein the acid that is purified is salicylic acid.

3. The process of claim 1 wherein the chelating agent is tetrasodium ethylenediaminetetraacetate.

4. The process of claim 1 wherein in step (g) the aqueous slurry is cooled to a temperature below 35° C. before the precipitated acid is separated therefrom.

5. The process for the purification of salicylic acid that comprises the following sequential steps:
  (a) forming an aqueous solution of an impure alkali metal salicylate, said impure salicylate being the product obtained by the carboxylation of an alkali metal phenate with carbon dioxide in the absence of water;
  (b) acidifying said aqueous solution with a mineral acid to lower its pH to 4.5 to 5.0;
  (c) adding to said acidified solution 0.9% to 2.5%, based on the weight of solids in the solution, of a chelating agent selected from the group consisting of ethylenediaminetetraacetic acid, diethylenetriaminepentaacetic acid, N-hydroxyethylethylenediaminetriacetic acid, citric acid, and the alkali metal and alkaline earth metal salts of said acids;
  (d) heating the resulting solution to a temperature in the range of 50° to 65° C.;
  (e) passing the heated solution through a column containing decolorizing carbon;
  (f) acidifying the resulting solution with a mineral acid to lower its pH to 1.8 to 2 and thereby precipitating salicylic acid from said solution;
  (g) cooling the resulting slurry to about 20° to 30° C.; and
  (h) recovering the precipitated salicylic acid from said slurry.

6. The process of claim 5 wherein the alkali metal salicylate in step (a) is sodium salicylate.

7. The process of claim 5 wherein the chelating agent is tetrasodium ethylenediaminetetraacetate.

8. The process of claim 5 wherein the mineral acid used in steps (b) and (f) is sulfuric acid.

References Cited

UNITED STATES PATENTS

| 2,918,491 | 12/1959 | Radue | 260—521 |
| 2,749,362 | 6/1956 | Berni | 260—521 |
| 3,131,048 | 4/1964 | Balassa | 260—521 |

FOREIGN PATENTS

| 105,613 | 4/1917 | Great Britain. |

LORRAINE A. WEINBERGER, Primary Examiner

D. E. STENZEL, Assistant Examiner